219-121 SR

9/2/86 OR 4,609,810

United States Patent [19]

O'Brien et al.

[11] Patent Number: 4,609,810

[45] Date of Patent: Sep. 2, 1986

[54] APPARATUS FOR CONTROLLING A PLASMA

[75] Inventors: Michael J. O'Brien, Bethel; Gordon F. Wallace, Newtown, both of Conn.

[73] Assignee: The Perkin-Elmer Corporation, Norwalk, Conn.

[21] Appl. No.: 624,313

[22] Filed: Jun. 25, 1984

[51] Int. Cl.⁴ .................................................. B23K 9/00

[52] U.S. Cl. ........................ 219/121 PT; 219/121 PR; 219/130.21; 219/121 PM; 315/111.51

[58] Field of Search .................. 219/121 PM, 121 PS, 219/121 PT, 121 PU, 137 R, 130.21; 156/643, 345, 646; 204/192 E, 192 EC; 315/111.51

[56] References Cited

U.S. PATENT DOCUMENTS

| | | | |
|---|---|---|---|
| 3,496,327 | 2/1970 | Vilkas | 219/130.21 |
| 3,602,683 | 8/1971 | Hishida et al. | 219/121 PT |
| 4,093,844 | 6/1978 | Fellure et al. | 219/130.21 |
| 4,306,175 | 12/1981 | Schleicher et al. | 315/111.51 |
| 4,328,068 | 5/1982 | Curtis | 204/192 E |
| 4,446,354 | 5/1984 | Kearney | 219/130.21 |

*Primary Examiner*—M. H. Paschall
*Attorney, Agent, or Firm*—F. L. Masselle; E. T. Grimes

[57] ABSTRACT

An apparatus for controlling a plasma discharge includes a light gathering tube remotely directed at the plasma discharge. The gathered light is transmitted, via a filter optic light pipe, to a detector that produces a signal that is compared with at least one reference signal. After comparing the signals the RF power to the plasma torch is either interrupted or continued.

7 Claims, 3 Drawing Figures

APPARATUS FOR CONTROLLING A PLASMA

BACKGROUND OF THE INVENTION

The present invention generally relates to an apparatus for controlling a plasma and, in particular, relates to such an apparatus in which the intensity of the plasma discharge is used to generate a control signal.

One of the more significant recent advances in the field of atomic spectroscopy is generally referred to as plasma emission spectroscopy. In such a system, the sample is heated by means of a plasma discharge to such a high temperature that atomic emission occurs. During atomic emission some of the electrons of an atom are, by the thermal energy imparted thereto, raised to a higher energy level. Upon decay, i.e., an electron returning to a lower energy level, a photon of light is emitted. This emitted light propagates at a specific wavelength which is characteristic of the particular element. Consequently, by determining the intensity of the light emitted at a characteristic wavelength the concentration of a particular element can be determined. Such an analytical technique is probably most advantageous for refractory elements that are relatively insensitive to other atomization techniques. This advantage derives from the high temperatures inherently associated with a plasma torch, i.e., on the order of about 5000° C.

The most conventional form of plasma torch presently in use is generally referred to as an inductively coupled plasma (hereinafter ICP). The gases necessary to sustain an ICP discharge are commonly introduced into a torch constructed of quartz. The high temperature plasma discharge is partially contained by a quartz tube. In such a torch, a quartz tube surrounds the torch to shape the plasma, which torch is ignited and maintained by means of a strong radio frequency (RF) field. The RF field is created by an RF load coil through which the gases are fed.

Because of the ability of ICP discharges to reach very high temperatures, which can easily exceed the melting temperature of quartz, the torch must be carefully monitored to prevent damage thereto. Excessive heating of the outer quartz tube generally occurs either during start-up or when insufficient gas flow is provided.

Regardless of the cause, it is difficult to measure the tube wall temperature for at least three reasons. First, it is difficult to provide any direct contact monitor to the quartz because of the high temperature thereof. Second, any form of electronic monitoring within the torch chamber is difficult due to the strong electromagnetic fields near the RF coil. Third, during the start-up of the torch, which occurs within the quartz tube, excessive temperatures can be reached quickly and without detection by conventional techniques. Additionally, since the ability to remove and/or replace the torch is a desirable convenience it is important to avoid complicating that procedure by including unnecessary devices within the torch chamber.

The above-recited difficulties are somewhat obviated by an apparatus for monitoring a plasma torch which is described in U.S. patent application Ser. No. 526,758 filed on Aug. 26, 1983 and assigned to the assignee hereof. Therein a photometer is externally affixed to the housing of a plasma torch chamber and directed so as to view the quartz tube of the plasma torch. By use of a pyrolytic sensor the temperature of the torch is monitored. This apparatus is, however, not immune to electrical noise, thermal drift and shortened component life-times due to the proximity of the apparatus to the torch.

SUMMARY OF THE INVENTION

Accordingly, it is one object of the present invention to provide an apparatus for controlling a plasma which is substantially immune to electrical noise and substantially unaffected by the temperature of the plasma.

This object is achieved, at least in part, by an apparatus having a light gathering means remote from the torch and a signal producing means responsive to the gathered light which is remote from the light gathering means.

Other objects and advantages will become apparent to those skilled in the art from the following detailed description read in conjunction with the appended claims and the drawing affixed hereto.

BRIEF DESCRIPTION OF THE DRAWING

The drawing, not drawn to scale, includes.

DETAILED DESCRIPTION OF THE INVENTION

Figure 1:
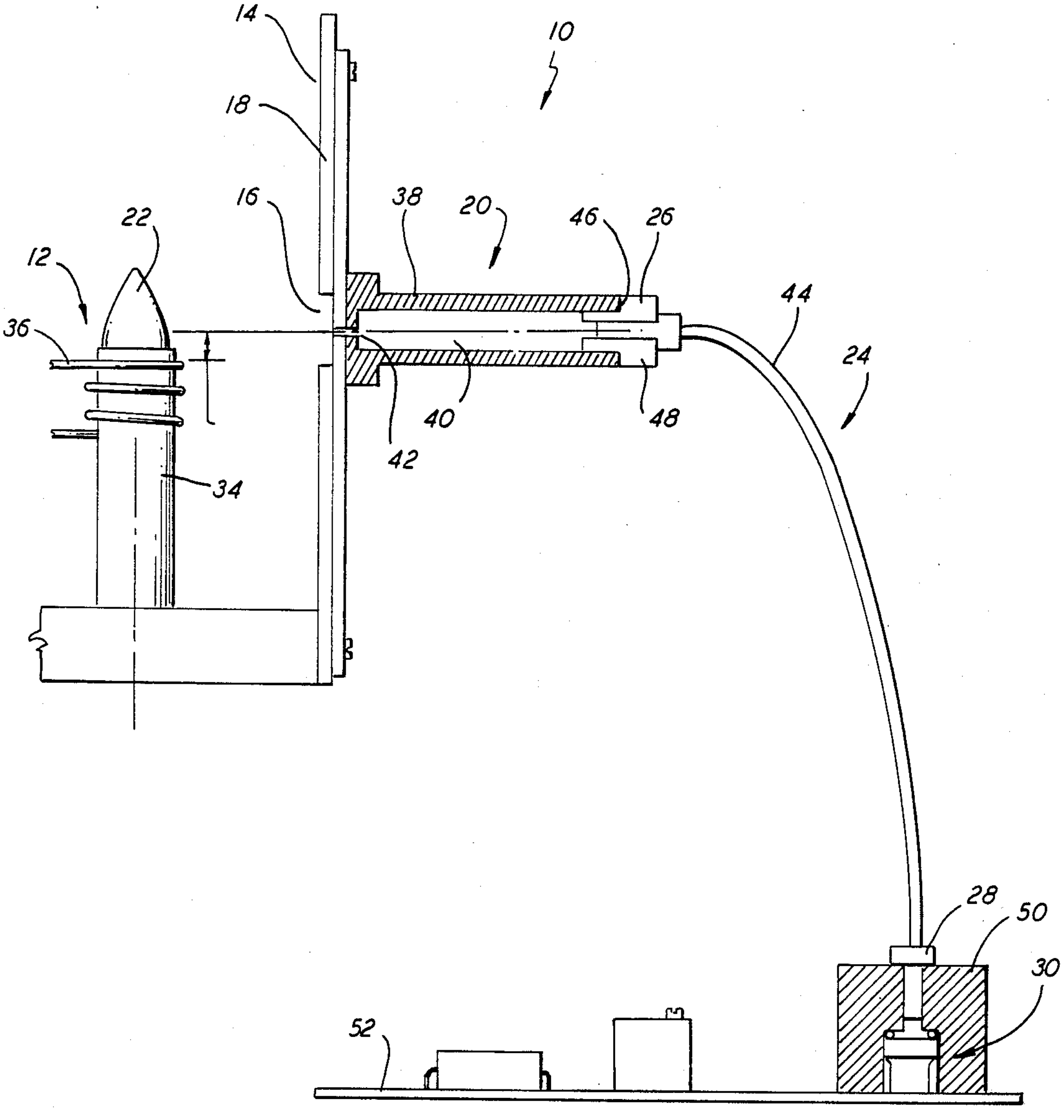
FIG. 1, which is a pictorial view, partially in section, of one embodiment of an apparatus embodying the principles of the present invention.

An apparatus, generally indicated at 10 in FIG. 1 and embodying the principles of the present invention, includes a plasma torch assembly 12 positioned within a torch chamber 14 which torch chamber 14 has an opening 16 in one wall 18 thereof. The apparatus 10 also includes a means 20 for gathering light from a plasma discharge flame 22 above the torch assembly 12. A means 24 for transmitting the light gathered by the means 20 is affixed, at one end 26 thereof, to the light gathering means 20 and, at the other end 28 thereof, to a means 30 for producing a signal responsive to the light so transmitted. The signal so produced is compared to at least one reference signal from a reference source 32. A control signal is produced as a result of the comparison, which control signal regulates the plasma torch assembly 12.

The plasma torch assembly 12 includes an outer quartz tube 34 positioned within an RF coil 36. In operation, an inert gas, usually Argon, is fed through the quartz tube 34 and ignited by the coil 36 to produce the plasma discharge flame 22.

The means 20 for gathering light includes a tube 38 affixed to the wall 18 of the torch chamber 14, the tube 38 defining an opening 40 therethrough. The opening 40 has a relatively smaller diameter proximate the wall 18 defining an aperture 42 and a relatively larger diameter throughout the remainder of the length of the tube 38. The tube 38 is mounted such that only light emitted by the plasma discharge flame 22, per se, enters the aperture 42. Preferably, the axis of the aperture 42 is substantially perpendicular to the axis of the quartz tube 34 of the torch 12 and centered on the flame 22 slightly above the quartz tube 34.

The light gathered by the aperture 42 traverses the opening 40 and is transmitted therefrom by the means 24 for transmitting light. In the preferred embodiment, the means 24 includes a fiber optic light pipe 44. The light pipe 44 is attached, at one end 26 thereof, to the end 46 of the tube 38 distal the torch chamber 14 by an adapter 48. The other end 28 of the fiber optic light pipe 44 is affixed to a housing 50 having the optically responsive signal producing means 30 therein. Preferably, as more fully explained below, the means 30 is mounted on a circuit board 52 which is remote from the light gathering means 20. In addition, the signal producing means 30 is, preferably, such that the current produced thereby is proportional to the intensity of light received by the aperture 42 and, hence, representative of the intensity of the plasma discharge flame 22.

Figure 2:
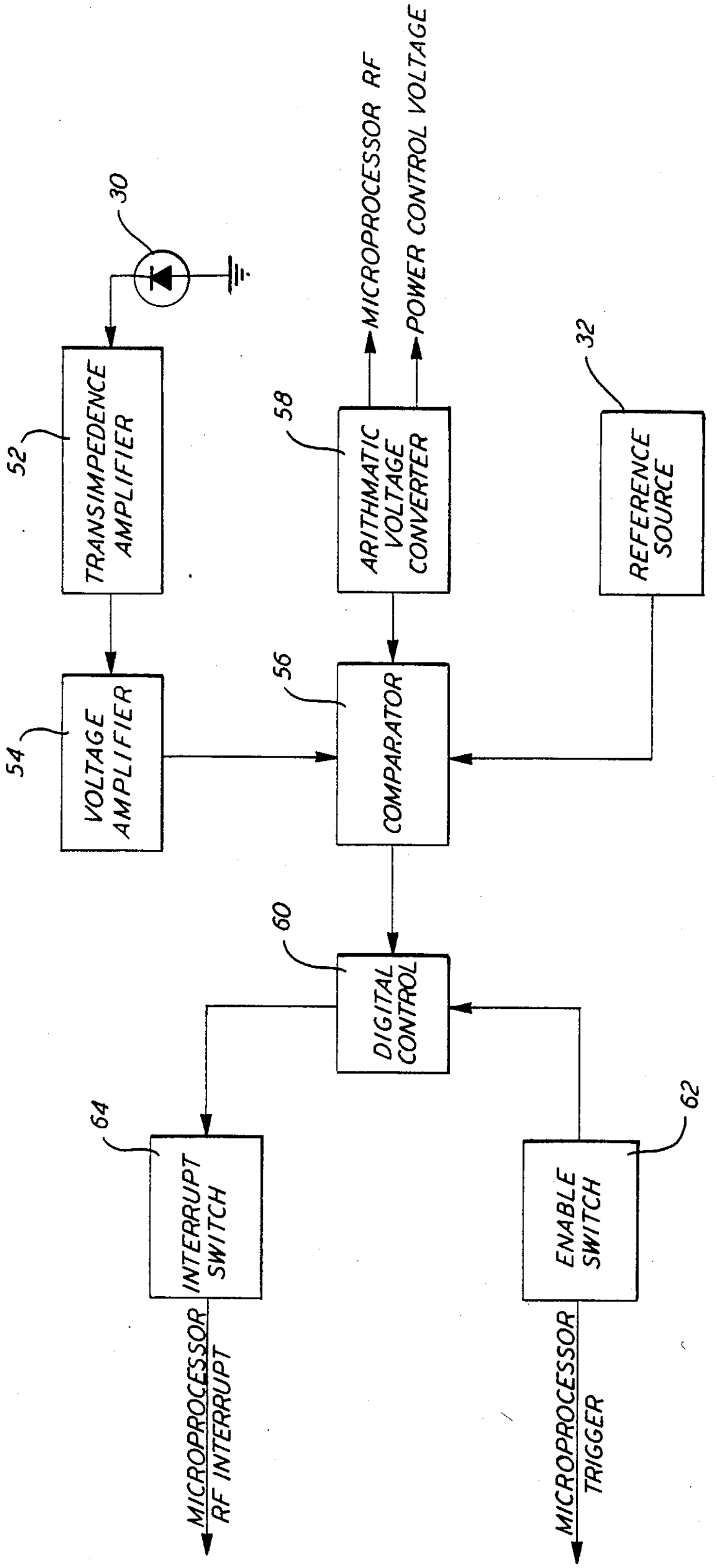
FIG. 2, which is a block diagram of the apparatus shown in FIG. 1.

Referring now specifically to FIG. 2, the current signal produced by the signal producing means 30 is transformed into a voltage signal via a trans-impedance amplifier 52 which voltage signal is then amplified by a voltage amplifier 54. This amplified signal is then provided as one input to a comparator 56, preferably a dual comparator.

The comparator 56 also has a first reference voltage input from the first reference source 32. The first reference source 32 provides a signal having a voltage level which is a fixed minimum value. That is, when the amplified voltage is compared to the voltage level from the first reference source 32, if the amplified voltage is greater than that of the fixed minimum value, the plasma torch 12 is permitted to continue operation, via a signal from the comparator 56 through an enable switch 62; whereas if the amplified voltage falls below the fixed reference level, a signal is outputted from the comparator 56 to an interrupt switch 64 which interrupts, or extinguishes, the operation of the torch 12.

Similarly, a second reference source 58 provides a voltage signal, which varies depending on the particular instantaneous RF power being delivered to the torch 12, to the comparator 56. The amplified voltage is also compared to this second reference voltage and similar decision conditions prevail, i.e., if the voltage falls below the instantaneous level of the second reference voltage then the power to the RF plasma torch 12 is interrupted, whereas if the voltage remains above the instantaneous level then the RF plasma torch 12 is permitted to continue operating.

The output of the comparator 56, after the two individual comparisons are made, is inputted to a digital control means 60 to produce either an interrupt signal, which immediately removes the RF power supply from the RF loading coil 36 of the plasma torch 12, or an enabling signal, which allows the RF plasma torch 12 to continue operation.

In one specific embodiment, the opening 16 in the wall 18 of the torch chamber 14 is a substantially vertical slot, i.e., parallel to the axis of the quartz tube 34 of the torch 12. Such an arrangement is preferred so that the aperture 42 of the light gathering means 20 can be vertically positioned regardless of the size of the torch 12 used. The aperture 42 is preferably about 1.6 millimeters diameter and positioned about 10 millimeters above the RF coil 36 such that it is directed centrally on the plasma discharge flame 22. The tube 38 of the light collection means 20 has an inside diameter on the order of about 6 millimeters and an effective optical length of about 4 centimeters. The fiber optic light pipe 44 is preferably plastic and additionally functions as an ultraviolet light filter to reduce the ultraviolet radiation reaching the photodiode at high RF powers. The fiber optic light pipe 44 is on the order of about 300 centimeters long and has an inside diameter on the order of about 1.0 millimeters.

In this particular embodiment, the signal producing means 30 is a photodiode, preferably a Model No. SD-172-12-12-221 manufactured and marketed by Silicon Detector Corporation, located in Newbury Park, Calif. Such a photodiode is responsive over an optical spectrum on the order of between 250 to 900 nanometers and thus substantially responds to the entire ultraviolet wavelength range.

Figure 3:
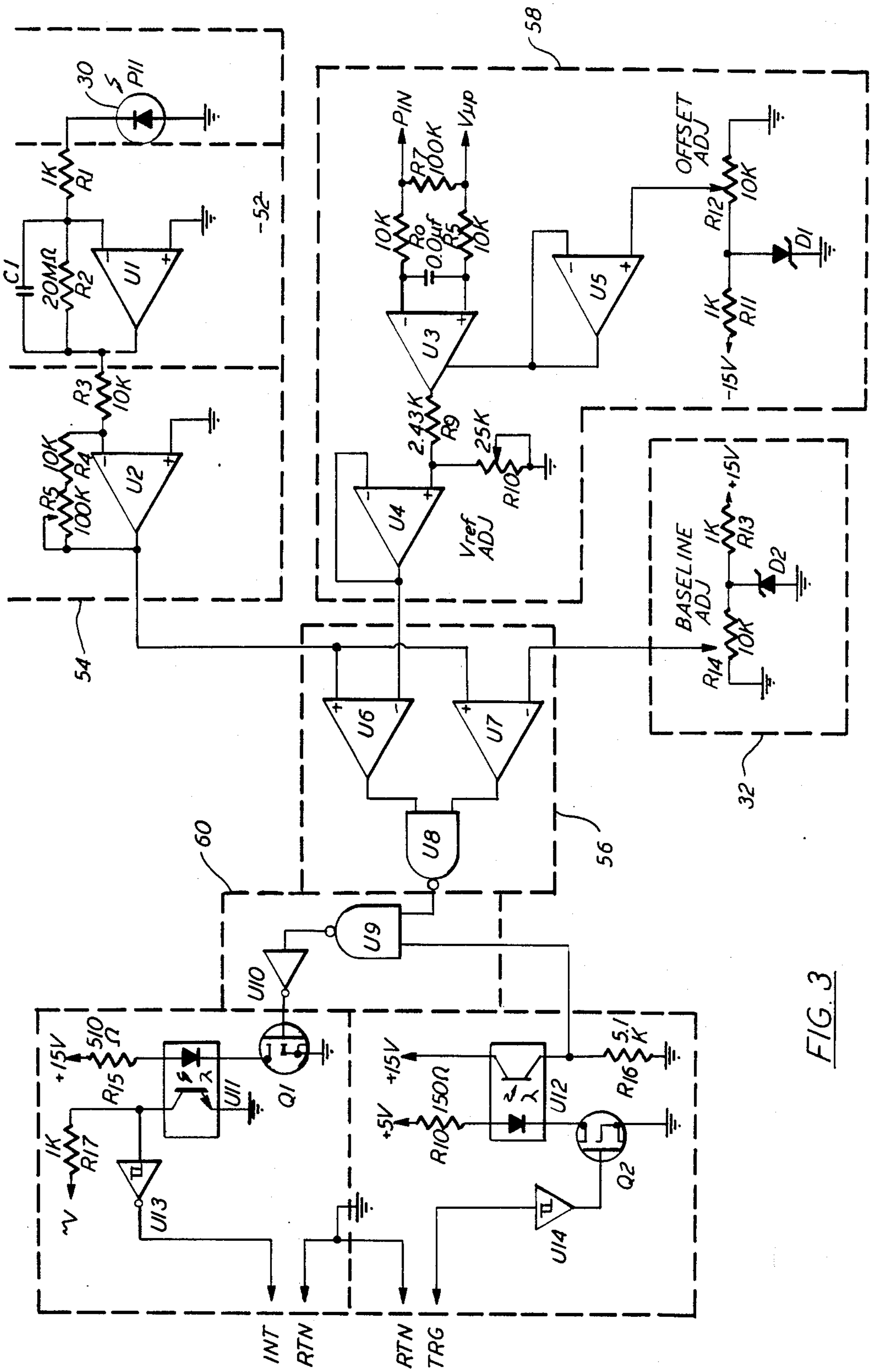
FIG. 3, which is a typical electrical schematic useful with the apparatus shown in FIGS. 1 and 2.

A more detailed circuit schematic is shown in FIG. 3. Therein it will be observed that the actual sensing circuitry includes the photodiode and an operational amplifier ($U_1$ which is a MOSFET input stage) used to convert the small current generated by the photodiode into an amplifiable voltage. The voltage is amplified by operational amplifier $U_2$ which provides a variable gain from between 0 DB to about 20 DB.

Reference voltages, which are derived by the microprocessor RF control voltage, establish a fixed reference voltage and a dynamic reference. Operational amplifier $U_3$ in conjunction with $R_6$, $R_7$, $R_8$ and $C_2$ provide a 1.6 KHz first order low pass filter which serves to significantly reduce both EMI and RFI interference picked up through connecting cables. The operational amplifier $U_5$ is a low impedance source which provides an offset control for $U_3$. This offset voltage is derived from a variable voltage source including R13, R14 and D1. A similar source 32 constitutes the fixed voltage source for the baseline reference. The operational amplifier $U_4$ functions as a buffered voltage divider. Hence, the slope and offset of the original RF control voltage are varied to obtain a linear voltage which provides a baseline adjustment for a constant baseline voltage output.

The dual level comparator 56 is effectively formed by $U_6$, $U_7$ (which are LM348 Quad Amplifiers available through National Semiconductor Inc.) and $U_8$ (which is a CD4011B Quad Nand device available from RCA Corporation). The digital control 60 that receives an output from the comparator 56 and provides a signal to the switches, 62 and 64, that either interrupts or continues the enablement of the RF torch 12. The specific components of this exemplary circuit are so well known in the art that further detailed description is deemed unnecessary.

The primary advantage of the apparatus 10 described herein is that the resultant control signal to either the interrupt switch 64 for switching off the RF power or to the enable switch 64 to allow RF power to continue flowing is a direct result of a measurement on the plasma discharge flame 22. In addition, the apparatus 10 provides two different references for comparison and therefore more accurately ensures that, should a bad plasma exist, the RF power to the loading coil 36 of the torch 12 will be removed. In fact, the response time of the present apparatus in the specific embodiment discussed is about 150 microseconds.

Another advantage of the apparatus 10 is that the optical portion, i.e., the light gathering and transmitting means, is simple, inexpensive and easy to use and replace. Prior apparatus of this kind usually required filters, lenses, optical choppers and the like.

Although the present apparatus has been described herein with respect to specific embodiments, these embodiments are considered exemplary and not limiting. Hence, the present invention is deemed limited only by the appended claims and the drawings attached hereto.

What is claimed is:

1. Apparatus for preventing damage to a plasma torch comprising:

a plasma torch which includes a quartz tube through which an inert gas flows and a helical RF coil disposed on the outside diameter of said quartz tube substantially at one end thereof;

said RF coil being energizable so as to ignite said inert gas emanating from said one end of said quartz tube, the ignited inert gas forming a plasma discharge;

light gathering means, directed at a predetermined volume above said RF coil, for gathering a portion of the light from the plasma discharge;

detector means, remote from said light gathering means, for producing a detector signal indicative of the light intensity of the plasma discharge;

light transmitting means, coupled between said light gathering means and said detector means, to transmit light from said light gathering means to said detector means;

reference signal means for supplying two reference signals comprising a static reference signal, having a predetermined value, and a dynamic reference signal proportional to the instantaneous power to said RF coil;

comparing means for comparing the detector signal with said two reference signals; and de-energizing means to de-energize said RF coil whenever the detector signal is below either of said two reference signals.

2. An apparatus as claimed in claim 1 wherein said light gathering means includes a cylinder having an opening at one end thereof defining an aperture, said aperture being of smaller diameter than the diameter throughout the remainder of said cylinder.

3. An apparatus as claimed in claim 2 wherein the axis of said cylinder is substantially perpendicular to the axis of said quartz tube and an adjustable distance above said RF coil.

4. An apparatus as claimed in claim 3 wherein said aperture has a diameter of about 1.6 millimeters and said predetermined volume is about 10 millimeters above said RF coil.

5. An apparatus as claimed in claim 1 wherein said light transmitting means includes a fiber optic light pipe providing optical communication between said light gathering means and said detector means.

6. An apparatus as claimed in claim 5 wherein said fiber optic light pipe filters out ultraviolet radiation.

7. An apparatus as claimed in claim 1 wherein said detector means includes a photodiode mounted remote from said plasma torch.

* * * * *